United States Patent [19]

Herd et al.

[11] Patent Number: 5,212,289

[45] Date of Patent: May 18, 1993

[54] REACTIVE AZO DYESTUFFS OBTAINED BY COUPLING DIAZOTIZED ACYLAMINO-AMINOBENZENE SULFONIC ACID COMPOUNDS WITH PYRIDONE DERIVATIVES

[75] Inventors: Karl-Josef Herd, Odenthal-Holz; Karl-Heinz Schündehütte, deceased, late of Leverkusen; Eva Schündehütte, heir, Leverkusen; Horst Jäger, Leverkusen, all of Fed. Rep. of Germany

[73] Assignee: Bayer Aktiengesellschaft, Leverkusen, Fed. Rep. of Germany

[21] Appl. No.: 712,860

[22] Filed: Jun. 10, 1991

[30] Foreign Application Priority Data

Jun. 19, 1990 [DE] Fed. Rep. of Germany ....... 4019421
Oct. 17, 1990 [DE] Fed. Rep. of Germany ....... 4032923

[51] Int. Cl.$^5$ ..................... C09B 62/405; D06P 1/382
[52] U.S. Cl. .................................... 534/633; 534/632; 534/887
[58] Field of Search ................. 534/633, 635

[56] References Cited

U.S. PATENT DOCUMENTS

| | | | |
|---|---|---|---|
| 3,994,906 | 11/1976 | Hegar III | 546/294 |
| 4,039,523 | 8/1977 | Hegar I | 534/635 |
| 4,092,308 | 5/1978 | Hegar | 534/635 |
| 4,283,331 | 8/1981 | Seitz et al. | 534/635 X |
| 4,299,764 | 11/1981 | Jager | 534/635 |

FOREIGN PATENT DOCUMENTS

| | | |
|---|---|---|
| 0281898 | 9/1988 | European Pat. Off. |
| 2238795 | 2/1973 | Fed. Rep. of Germany ...... 534/635 |
| 1359171 | 7/1974 | United Kingdom . |

*Primary Examiner*—Mary C. Lee
*Assistant Examiner*—Fiona T. Powers
*Attorney, Agent, or Firm*—Sprung Horn Kramer & Woods

[57] ABSTRACT

Dyestuffs in the form of their free acid have the following formula (1)

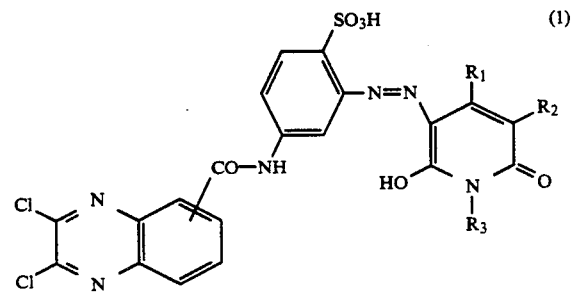

in which the substituents have the meaning given in the description.

The dyestuffs according to the invention are suitable for dyeing hydroxyl-containing fiber materials in yellow shades.

1 Claim, No Drawings

REACTIVE AZO DYESTUFFS OBTAINED BY COUPLING DIAZOTIZED ACYLAMINO-AMINOBENZENE SULFONIC ACID COMPOUNDS WITH PYRIDONE DERIVATIVES

The invention relates to reactive monoazo dyestuffs which, in the form of the free acid, have the structure

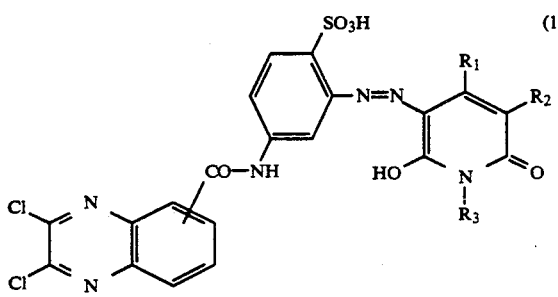
(1)

in which
$R_1$ is H, substituted or unsubstituted $C_1$-$C_8$-alkyl, $CO_2H$, $CH_2SO_3H$, $C_8H_5$,

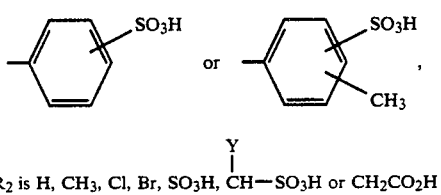

$R_2$ is H, $CH_3$, Cl, Br, $SO_3H$, $\overset{Y}{\underset{|}{CH}}-SO_3H$ or $CH_2CO_2H$ in which
Y is hydrogen or substituted or unsubstituted $C_1$-$C_6$-alkyl,
$R_3$ is H, substituted or unsubstituted $C_1$-$C_6$-alkyl,

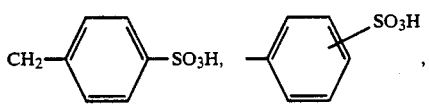

with the proviso that the pyridone radical is substituted by at least one sulphato or sulpho radical.

Examples of substituents of the substituted $C_1$-$C_6$-alkyl radicals in the definition of $R_1$, $R_3$ and Y are hydroxyl, methoxy, ethoxy, carboxyl, methyl, chlorine, sulpho and sulphato.

Dyestuffs of the structure (2)

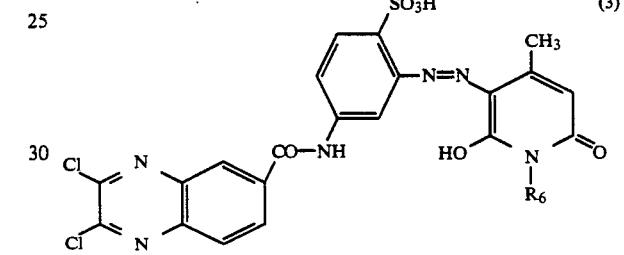
(2)

in which $R_4$ is $CH_2SO_3H$, $SO_3H$ and $\overset{CH_3}{\underset{|}{CH}}-SO_3H$ $R_5$ is the hydrogen or $C_1$-$C_4$-alkyl which is unsubstituted or substituted by hydroxyl, methoxy, ethoxy, carboxyl or chlorine, and dyestuffs of the structure (3)

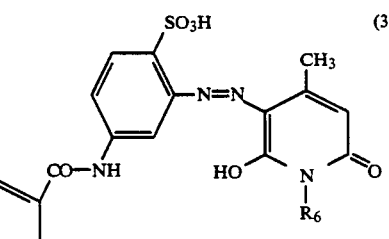
(3)

in which
$R_5$ is $CH_2CH_2SO_3H$, $CH_2CH_2OSO_3H$,

may be mentioned in particular.
Particular preference is given to dyestuffs of the structure (4)

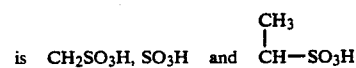
(4)

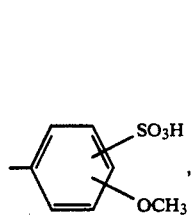

in which
$R_7$ is H, $CH_3$ or $C_2H_3$.

The invention also relates to a process for the preparation of the reactive dyestuffs of the structure (1) by
a) condensing aminoazo dyestuffs of the structure (5)

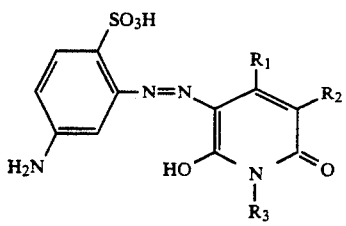

in which

R₁, R₂ and R₃ have the meaning mentioned at the beginning, with 2,3-dichloro-6-(or 5-)quinoxalinecarbonyl chloride in the presence of acid-binding agents, or else b) diazotising the monocondensation product of 2,4-diaminobenzenesulphonic acid with 2,3-dichloro-6-(or 5-)quinoxalinecarbonyl chloride in the usual manner and coupling the product onto pyridones of the structure (6) or those of the structure (7).

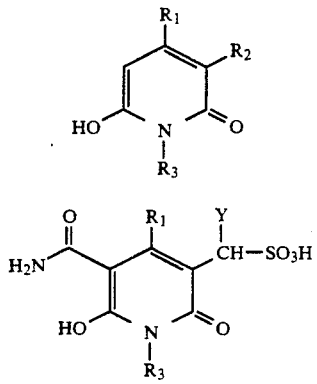

as are mentioned, for example, in German Offenlegungsschrift 2,162,858,
in which R₁, R₂ and R₃ have the meaning mentioned at the beginning.

The aminoazo compounds of the structure (5) are obtained by coupling diazotised 4-acylamino-2-aminobenzenesulphonic acid onto pyridones of the structure (6) or (7), followed by acid hydrolysis of the resulting acylaminoazo compounds.

Selected examples of sulpho-containing pyridones of the structure (6) and (7) are, inter alia:
3-aminocarbonyl-1,4-dimethyl-5-sulphomethyl-6-hydroxy-2-pyridone,
3-aminocarbonyl-1-ethyl-4-methyl-5-sulphomethyl-6-hydroxy-2-pyridone,
1,4-dimethyl-5-sulpho-6-hydroxy-2-pyridone, 4-methyl-5-sulpho-1-(4'-sulphobenzyl)-6-hydroxy-2-pyridone,
1-methyl-4-sulphomethyl-6-hydroxy-2-pyridone,
1-ethyl-3,4-bis-(sulphomethyl)-6-hydroxy-2-pyridone,
4-methyl-1-(2,-sulphoethyl)-6-hydroxy-2-pyridone,
4-methyl-1-(2,-sulphatoethyl)-6-hydroxy-2-pyridone,
4-methyl-1-(2,-sulphatoethyl)-3-sulpho-6-hydroxy-2-pyridone,
3-chloro-4-methyl-1-(2,-sulphoethyl)-6-hydroxy-2-pyridone, pyridone,
3,4-dimethyl-1-(2,-sulphatoethyl)-6-hydroxy-2-pyridone,
4-carboxy-3-sulphomethyl-6-hydroxy-2-pyridone,
1-ethyl-4-isopropyl-3-sulphomethyl-5-carbamoyl-6-hydroxy-2-pyridone,
1,4-diethyl-3-sulphomethyl-5-carbamoyl-6-hydroxy-2-pyridone,
1-methyl-4-isopropyl-3-sulphomethyl-5-carbamoyl-6-hydroxy-2-pyridone,
1-ethyl-4-propyl-3-sulphomethyl-5-carbamoyl-6-hydroxy-2-pyridone,
4-methyl-3-sulphomethyl-5-carbamoyl-2,6-dihydroxy-pyridine,
1-methyl-3-sulphomethyl-4-methyl-6-hydroxy-2-pyridone,
1-ethyl-3-sulphomethyl-4-methyl-6-hydroxy-2-pyridone,
1(β-hydroxyethyl)-3-sulphomethyl-4-methyl-6-hydroxy-2-pyridone,
1-butyl-3-sulphomethyl-4-methyl-6-hydroxy-2-pyridone,
1,4-dimethyl-3-sulphomethyl-6-hydroxy-2-pyridone,
1-(β-methoxyethyl)-3-sulphomethyl-4-methyl-6-hydroxy-2-pyridone,
1-propyl-3-sulphomethyl-4-methyl-6-hydroxy-2-pyridone,
1-(β-acetylaminoethyl)-3-sulphomethyl-4-methyl-6-hydroxy--pyridone,
1-(γ-dimethylaminopropyl)-3-sulphomethyl-4-methyl-6-hydroxy-2-pyridone and
3-sulphomethyl-4-methyl-2,6-dihydroxy-pyridine The reaction conditions of the preparation are those customary in the area of acylation, diazotisation and coupling. Thus, the dyestuffs according to the invention and the dyestuff intermediates are preferably prepared in an aqueous medium. The condensation with the 2,3-dichloroquinoxalinecarbonyl chloride is preferably carried out at 30 to 60° C., 40 to 50° C., in neutral to weak acidic medium, which the hydrochloric acid released in condensation is neutralised by adding basic sub These can be added either in solid or dissolved Examples are: LiOH, Li₂CO₃, NaOH, Na₂CO₃, NaHCO₃, KOH, K₂CO₃, MgO, MgCO₃, Ca(OH)₂, CaCO₃.

The reactive dyestuffs of the formula (I) can be isolated and processed to give useful, dry dyestuff preparations. They are preferably isolated at lowest possible temperatures by salting out and filtration. If desired, the dyestuffs removed by filtration can be dried by adding a buffer mixture, for example mono-and dinatrium phosphate; the drying is preferably carried out at moderately high temperatures and under reduced pressure. By spray-drying the entire preparation mixture, it is in some cases possible to prepare the dry preparations according to the invention directly, i.e. without isolating the dyestuffs in between.

The reactive azo dyestuffs of the (1) dye hydroxyl-containing fibre material, in particular cotton, in brilliant yellow shades. The dyestuffs have excellent affinity and produce high fixation yields. The dyeings have an excellent fastness level and can be etched.

The abovementioned formulae are those of the free acids. In general, the salts are obtained in the synthesis, which are also provided by the present invention, in general the alkali metal salts, in particular the sodium salts or lithium salts and dyestuffs are also used in this form for dyeing.

EXAMPLE 1

33.4 g of 4-acetamino-2-aminobenzenesulphonic acid are diazotised in a known manner under acidic conditions with sodium nitrite solution. 39.5 g of 3-aminocarbonyl-1,4-dimethyl-5-sulphomethyl-6-hydroxy-2-pyridone are added to the ready-to-use diazonium salt suspension, and the pH of the reaction mixture is slowly brought to 7.5 with 20% strength sodium carbonate solution and kept constant. After 30 minutes, the coupling reaction is completed.

The dyestuff mixture (volume 700 ml) is then acidified with 100 ml of concentrated hydrochloric acid and heated at 95-98° C. for 1 hour. For a short period of time, this results in a deep yellow solution. Towards the end of hydrolysis, the amino azo compound precipitates in crystalline form. It is cooled to room temperature and, after addition of 40 g of common salt, filtered off with suction.

The moist yellow paste is stirred in 400 ml of water and dissolved at a pH of 6.5 with the addition of lithium hydroxide solution. 44 g of freshly sublimed 2,3-dichloro-6-quinoxalinecarbonyl chloride are added to the solution heated to 45° C. The pH of the acylation reaction is kept constant between 6.5 and 7.0 metering sodium carbonate solution. The temperature remains at 45° C. After no more change in the pH is observed, the mixture is heated to 50° C., 10 g of filtering aid and 5 g of activated carbon are added, and the solution is clarified. 30 g of common salt are added to the warm filtrate, and the mixture is stirred until room temperature has been reached. The yellow reactive dyestuff is filtered off with suction nd dried at 70° C. This gives 120 g of a salt-containing dyestuff powder which dyes cotton in a brilliant greenish yellow shade and has the following structure ($\lambda_{max}(H_2O) = 423$ nm).)

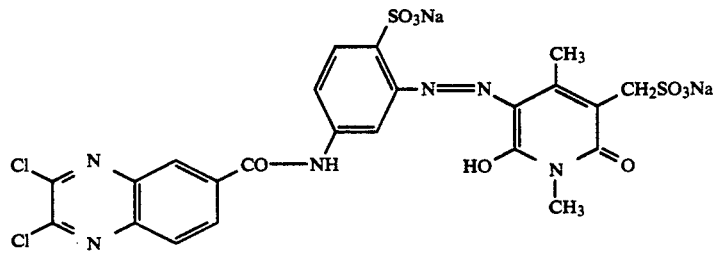

Example 1 is repeated, replacing the coupling component 3-aminocarbonyl-1,4-dimethyl-5-sulphomethyl-6-hydroxy-2-pyridone by comparable pyridone derivatives, to give likewise valuable dyestuffs all of which dye cotton in the same greenish yellow shade.

EXAMPLE 2

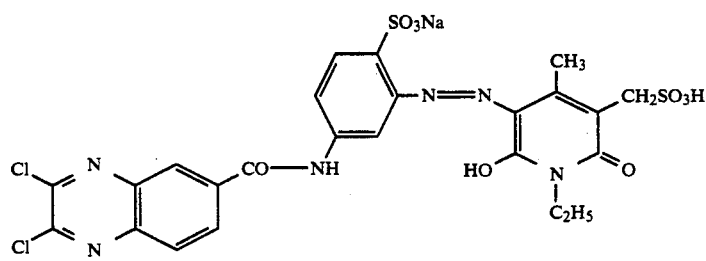

EXAMPLE 3

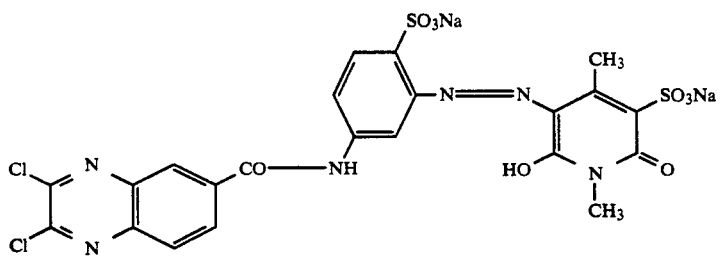

EXAMPLE 4

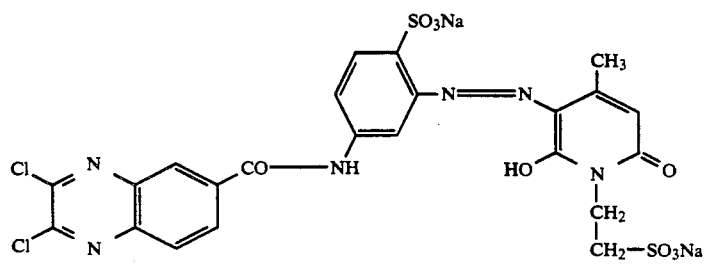

EXAMPLE 5
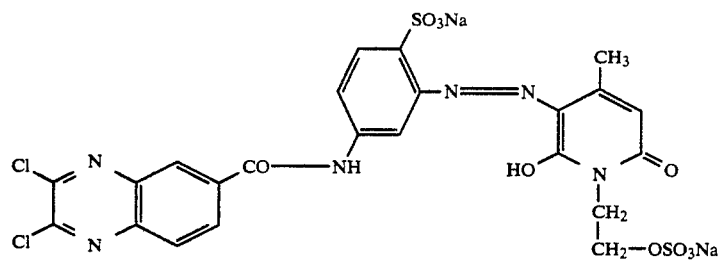
EXAMPLE 6
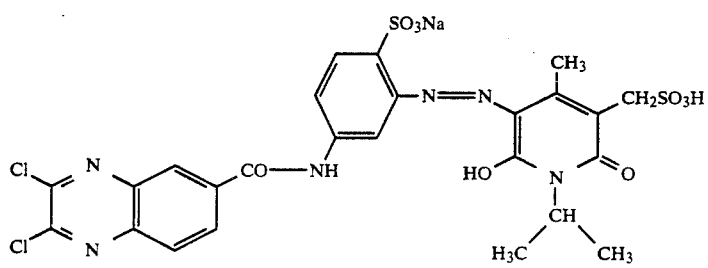
We claim:
1. A dyestuff of the following formula
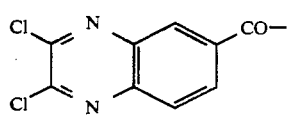
(4)
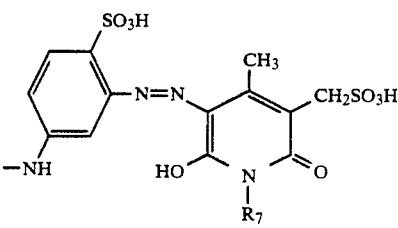
in which
R₇ is H, CH₃ or C₂H₅.
* * * * *

UNITED STATES PATENT AND TRADEMARK OFFICE
CERTIFICATE OF CORRECTION

PATENT NO. : 5,212,289

DATED : May 18, 1993

INVENTOR(S) : Herd et al.

It is certified that error appears in the above-identified patent and that said Letters Patent is hereby corrected as shown below:

Col. 1, line 24  Delete " $C_8H_5$ " and substitute -- $C_6H_5$ --

Col. 2, line 37  Delete " $R_5$ " and substitute -- $R_6$ --

Col. 2, line 64  Delete " $C_2H_3$ " and substitute -- $C_2H_5$ --

In addition the certificate to issue will show, column 1, line 23, "$C_1$-$C_8$" should read --$C_1$-$C_6$--

Signed and Sealed this

Fifteenth Day of March, 1994

*Attest:*

BRUCE LEHMAN

*Attesting Officer*   *Commissioner of Patents and Trademarks*